(12) United States Patent
Hahn et al.

(10) Patent No.: US 7,071,645 B2
(45) Date of Patent: Jul. 4, 2006

(54) BRAKING DEVICE FOR AN ELECTRIC MOTOR, ELECTRICAL APPARATUS PROVIDED WITH THE BRAKING DEVICE, AND A METHOD OF BRAKING

(75) Inventors: Dietmar Hahn, Gerlingen (DE); Roland Walter, Tiefenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/824,573

(22) Filed: Apr. 14, 2004

(65) Prior Publication Data

US 2004/0207351 A1 Oct. 21, 2004

(30) Foreign Application Priority Data

Apr. 17, 2003 (DE) ................. 103 17 636

(51) Int. Cl.
*H02P 3/12* (2006.01)
*H02P 3/22* (2006.01)

(52) U.S. Cl. ............... 318/379; 318/381; 318/362; 318/367; 318/380

(58) Field of Classification Search ............ 318/379, 318/362, 365, 368–370
See application file for complete search history.

(56) References Cited

U.S. PATENT DOCUMENTS

| | | | |
|---|---|---|---|
| 4,124,812 A * | 11/1978 | Naito et al. ............. 318/371 |
| 4,243,919 A | 1/1981 | Brown | |
| 5,332,954 A * | 7/1994 | Lankin ................ 318/139 |
| 5,361,022 A | 11/1994 | Brown | |
| 5,449,992 A * | 9/1995 | Geiger et al. ........... 318/362 |
| 5,708,333 A * | 1/1998 | Kirn ................... 318/246 |
| 5,969,303 A * | 10/1999 | Piserchia et al. ........ 187/297 |
| 6,013,993 A * | 1/2000 | Barbisch ............... 318/379 |
| 6,078,156 A * | 6/2000 | Spurr .................. 318/368 |
| 6,094,025 A * | 7/2000 | Rosa ................... 318/381 |
| 6,104,155 A * | 8/2000 | Rosa ................... 318/381 |
| 6,236,177 B1 * | 5/2001 | Zick et al. ............ 318/362 |
| 6,353,297 B1 * | 3/2002 | Meyer ................. 318/273 |
| 6,448,727 B1 * | 9/2002 | Rotterhusen ........... 318/375 |
| 6,823,134 B1 * | 11/2004 | Glasgow et al. ....... 200/42.01 |

FOREIGN PATENT DOCUMENTS

EP 0 578 366 A2 1/1994

* cited by examiner

*Primary Examiner*—David Martin
*Assistant Examiner*—Renata McCloud
(74) *Attorney, Agent, or Firm*—MIchael J. Striker

(57) ABSTRACT

A braking device for an electric motor of a power tool has a short circuit switch for short circuiting an armature winding of the electric motor during a braking process, the short circuit switch for controlling its switch condition having a control input, a control unit connected with the control input of the short circuit switch for performing a phase control of the short circuit switching during the braking process in order to avoid brush fire; also an electrical device with such a braking device and a braking method are proposed as well.

7 Claims, 3 Drawing Sheets

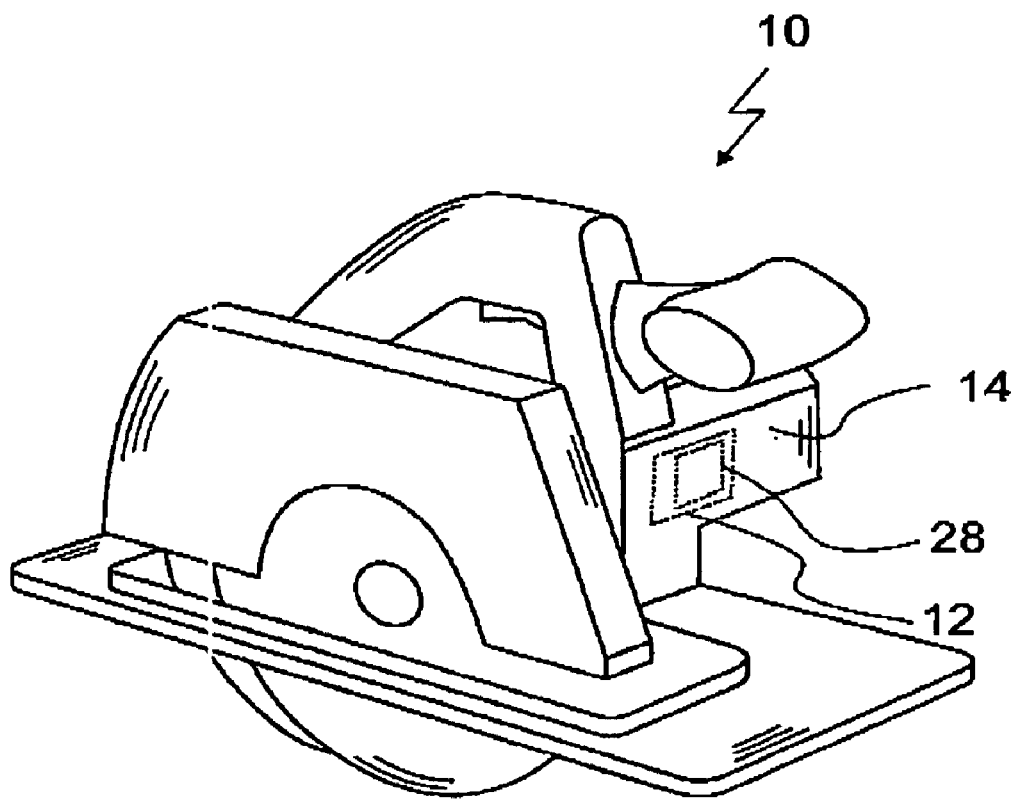
Fig. 1 (amended)

BRAKING DEVICE FOR AN ELECTRIC MOTOR, ELECTRICAL APPARATUS PROVIDED WITH THE BRAKING DEVICE, AND A METHOD OF BRAKING

BACKGROUND OF THE INVENTION

The present invention relates to a braking device for an electric motor, in particular for an electric motor of a power tool. The present invention also relates to an electrical apparatus, such as for example a power tool, provided with a braking device. The invention also relates to a method of braking with the inventive braking device.

Hand power tools such as for example power drills and hand circular saws are driven by direct current series motors, which are identified as universal motors.

When such hand power tools are turned off, the direct current series motor, due to the mechanical inertia of the drive train, does not stop. This poses for the user the danger of an injury during running out.

For reducing this injury danger it is suggested in the European patent document EP0578366 A2 to provide a braking device for a direct current series motor, in which the armature winding of the direct current series motor can be short circuited by a short circuit switch to provide a braking action, so that the direct current series motor stops faster after the turning off. This braking action is produced in that the short circuit current in the armature winding forms a magnetic field which counteracts the outer magnetic field of the field winding of the direct current series motor.

The control of the short circuit switch is performed by the user of the hand power tool, wherein the main switch of the hand power tool is coupled with the short circuit switch. During turning off of the hand power tool by the user, simultaneously a closing of the short circuit switch is performed.

SUMMARY OF THE INVENTION

Accordingly, it is an object of the present invention to provide a braking device for an electric motor, which is a further improvement of the existing devices.

More particularly, it is an object of the present invention to provide a braking device for an electric motor, in which an armature winding of the electric motor can be short circuited by a short circuit switch.

In keeping with these objects and with others which will become apparent hereinafter, one feature of the present invention resides, briefly stated, in a braking device for an electric motor in which the short-circuit switch has a control input for controlling its switching condition, wherein the control input of the short-circuit switch is connected with a control unit, to perform during the braking process a phase control of the short-circuit switch or the electric current flowing through the armature winding for avoiding brush fire.

In accordance with the present invention, it is possible to provide a short circuit braking of a direct current series motor, this is with reduced brush fire, when compared with the known braking device for a direct series motor.

The phase control of the electric current flowing during the braking process through the armature winding of the electric motor is preferably performed with such a phase angle, that the effective value of the electric current approximately corresponds to a normal short circuit, so that it is possible to provide in the same braking action during a normal short circuiting.

The phase control performed in accordance with the present invention is generally known and disclosed for example in Philippow, E.: Taschenbuch Elektrotechnik, Vol. 5, Carl Hanser Verlag, $1^{st}$ edition, pages 933+, so that a detailed description of the technical details of the phase control are dispensed with in the further description and the content of this document is fully incorporated in the description with respect to the phase control.

Preferably, the inventive braking device is provided with a delay switch for separation of the electric motor from a current supply. The delay switch is operated by a user and turns off after a switch handling by the user with a time delay. This time-delayed turning off of the electric motor is advantageous with the inventive braking device since the short circuiting of the armature winding in connection with the outer magnetic field produced by field winding of the electric motor, produces the desired braking action. Such a turning off of the field winding reduced the braking action and lengthened the running out time. The actuation of the delay switch by the user leads advantageously to a short circuiting of the armature winding in connection with the inventive phase control of the current flowing through the armature winding, whereas the complete turning off of the electric motor is performed with the field winding and the armature winding with a time delay.

The delay switch has preferably a predetermined time delay between a switch handling of the user and thereby caused separation of the current supply, wherein the time delay preferably is at least as long as the braking process. Such a selection of the time delay of the delay switch is advantageous, so that the field winding during the total running out time remains switched and can contribute to the braking action.

The delay switch preferably is connected with the control unit, to inform the control unit via a switch handling of the user, and thereby the control unit can correspondingly control the short circuit switch.

Moreover, preferably a handling sensor is provided, which in a power tool can recognize whether a power tool is hand-guided by the user or put down. A recognition of this different operational condition of the power tool is desirable since the braking process must be performed relatively fast when the power tool is put down, because then an increased injury danger takes place. If the user to the contrary holds the power tool with his hands, the running out time can be longer since the injury danger is then reduced. The handling sensor can be for example a simple switch which is integrated in the handle of the hand power tool and automatically actuated by the user of the hand power tool by holding the handle of the hand power tool.

In accordance with a preferable embodiment of the inventive braking device, a rotary speed sensor is further provided for detecting the rotary speed of the electric motor. The rotary speed sensor is connected with the control unit of the braking device so as to influence the braking process, depending on the rotary speed of the electric motor. The rotary speed sensor makes possible the recognition of a trouble, which can occur, for example by clamping the tool in the workpiece to be treated. In such a case, an emergency turning off of the power tool with the highest possible speed is desirable. The regulating parameter for the armature and field current as well as for the phase control can be then adjusted so that the running out time is minimal. With a turning off in the normal operation with a nominal rotary speed, the regulated parameters for the armature and field current as well as for the phase control to the contrary are preferably selected so that a minimal brush fire occurs.

Furthermore, the inventive braking device preferably has a safety switch for short circuiting of the electric motor at the input side, whereby an emergency turning off is possible. With an input-side short circuit of the electric motor by the safety switch, conventionally the electrical service cut off or a built-in fuse is released, which in the event of a faulty condition leads to a safe turning off of the built-in semiconductor switch.

The short circuit switch for the armature winding of the electric motor is preferably a semiconductor switch such as a triac switch. However, the invention is not limited to this switch type, but can be realized basically with other switch types as well.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a hand circular saw with an inventive braking device in a perspective;

DESCRIPTION OF THE PREFERRED EMBODIMENTS

The perspective view in FIG. 1 shows a conventionally designed hand circular saw 10, and therefore a detailed description of the hand circular saw 10 can be dispensed with since it is disclosed in patent literature.

Figure 2:
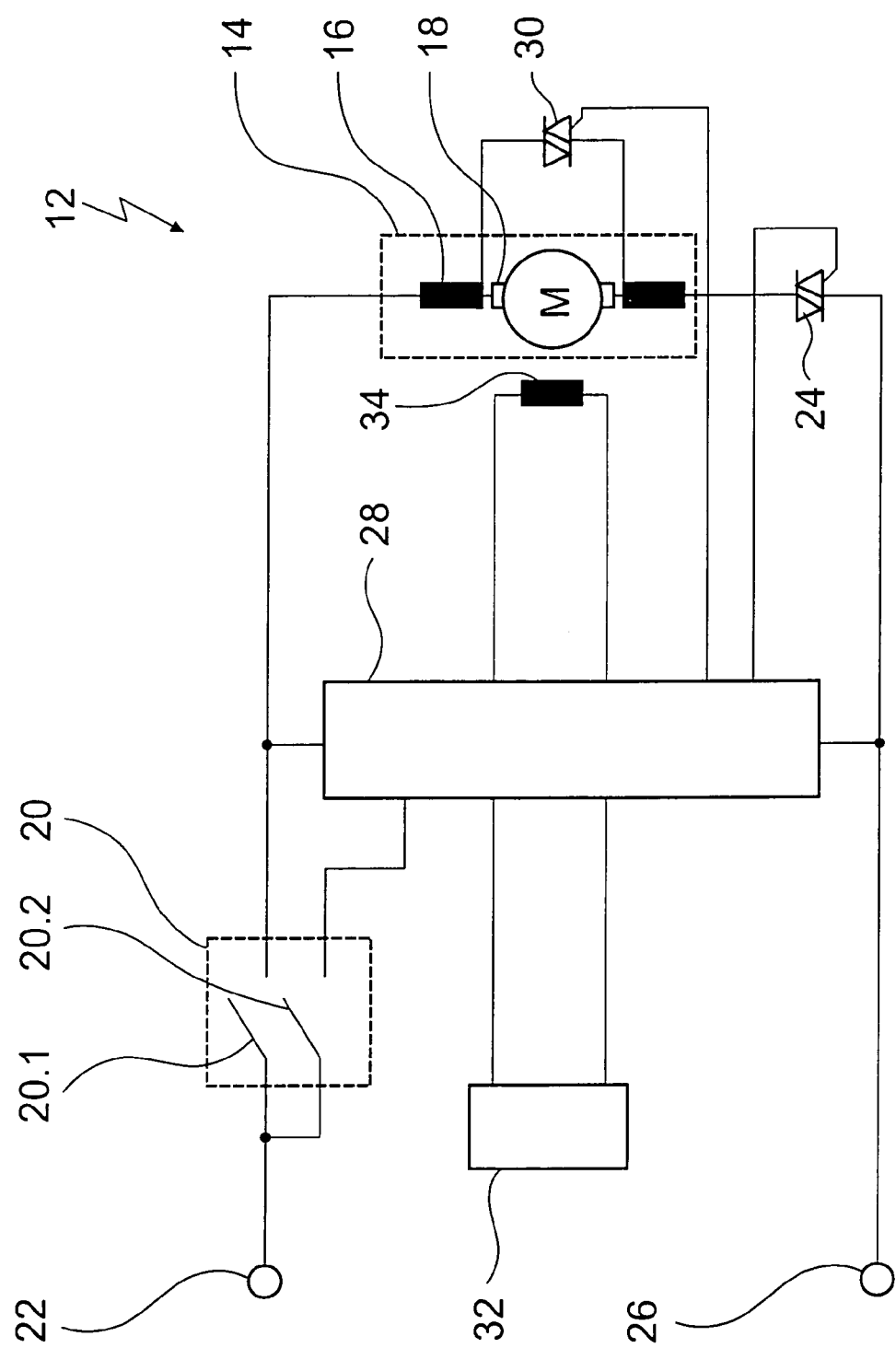
FIG. 2 is a switching diagram of the inventive braking device.

In accordance with the present invention, the hand circular saw 10 has a braking device which is identified with reference numeral 12. It is shown in FIG. 2 in form of a switching diagram and will be described in detail herein below.

The mechanical drive of the hand circular saw 10 is performed by a direct current serial motor 14 having a field winding 16 and an armature winding 18. The field winding 16 and the armature winding 18 are connected in series.

The drive current series motor 14 is connected through a delay switch 20 with a first connecting contact 22 and through a triac 24 with a second connecting contact 26. Both connecting contacts 22 and 26 are connected with a current supply in a conventional manner. Moreover, the braking device 12 has a control unit 18 which among others is controlled by the triac 24, for adjusting the rotary speed of the direct current series motor 14, as will be described herein below.

The device switch 20 is formed bi-polar and has two separate switch elements 20.1 and 20.2. The switch element 20.2 can be actuated by the user of the hand circular saw 10, while the switch element 20.1 follows the switching condition of the switching element 20.2 with a predetermined time delay.

With separation of the switching element 20.2 by the user of the hand circular tool 10, the switching element 20.1 first remains closed during the delay time and then separates. The technical importance of this delayed control of the switching element 20.1 in the inventive braking device 20 will be explained in detail later on.

Furthermore, the inventive braking device 12 has a triac 30 which makes possible a short circuiting of the armature winding 18 for braking the drive current series motor 14. The triac 30 is controlled by the control unit 28, as will be described in detail herein below.

Furthermore, the braking device 12 has a handling sensor 32 connected with the control unit 28 and determining whether the hand circular saw 10 is held by the operator in his hand or is put down. This difference is important, since there is a danger when the direct current series motor 14 is running while the operator no longer holds the hand circular saw 10 in his hand. In such dangerous situations an emergency turning off of the hand circular saw 10 is required, as will be described herein below.

Finally, the braking device 12 has a rotary speed sensor 34 which is also connected with the control unit 28. The rotary speed sensor 34 also has the task of recognizing a dangerous situation for correspondingly influence the braking process, as will be explained herein below.

The operation of the inventive braking device 12 is as follows:

In a normal operation the operator holds the hand circular saw 10 firmly with his hand. This is recognized by the handling sensor 32 and is signaled to the control unit 28.

Further, the direct current series motor 14 in normal operation can rotate freely. This is recognized by the rotary speed sensor 34 and signaled to the control unit 28.

The operator can manually close the switching element 20.2 whereby also the switching element 20.1 is closed so that the direct current series motor 14 is provided with current.

The control unit 28, by a suitable control of the triac 24, can regulate the rotary speed of the direct current series motor 14 to a predetermined nominal value.

During this normal operation the control unit 28 controls the triac 30 non-conductively, so that the drive current series motor 14 operates in a normal way.

If the operator turns off the hand circular saw 10 by actuating the switching element 20.2, this is recognized by the control unit 28. The control unit 28 performs a triggering of the triac 30 so that the armature winding 18 of the direct current series motor 14 is short circuited.

After the separation of the switching element 20.2, the switching element 20.1 of the delay switch 20 remains however closed during a predetermined delay time, so that the field winding 16 of the direct current series motor 14 is further provided with current. Both the triac 24 and the triac 30 perform a phase control of the field current or short circuit current.

The outer magnetic field which is formed by the field winding 16 during the braking process cooperates with the magnetic field formed by the armature winding 18 so that a braking moment is generated. Thereby the running out time of the direct current series motor 14 is reduced.

During such a normal turning off of the direct turning series motor 14, the control of the triacs 30 and 24 is performed so that a minimal brush fire occurs.

Moreover, the inventive braking device allows 12 allows also an emergency turning off of the hand circular saw 10. Such an emergency turning off is required for example when the circular saw 10 falls from the hand of the operator, that is recognized by the handling sensor 32. In such a dangerous situation the control unit 28 controls both triacs 24 and 30, so that a maximum braking action occurs, whereas a strong brush fire and a greater carbon wear is taken into consideration as well.

Moreover, an emergency turning off is performed when the hand circular saw 10 is fixed, which can be caused for example by a clamping of the saw blade in the workpiece to be sawed. This dangerous situation is detected by the rotary speed sensor 34 because of a significant and sudden rotary speed drop, and signaled to the control unit 28. The control unit 28 controls both triacs 24 and 30 so that the braking action is minimal, wherein moreover a strong brush fire and a corresponding high carbon wear is taken into consideration.

Figure 3:
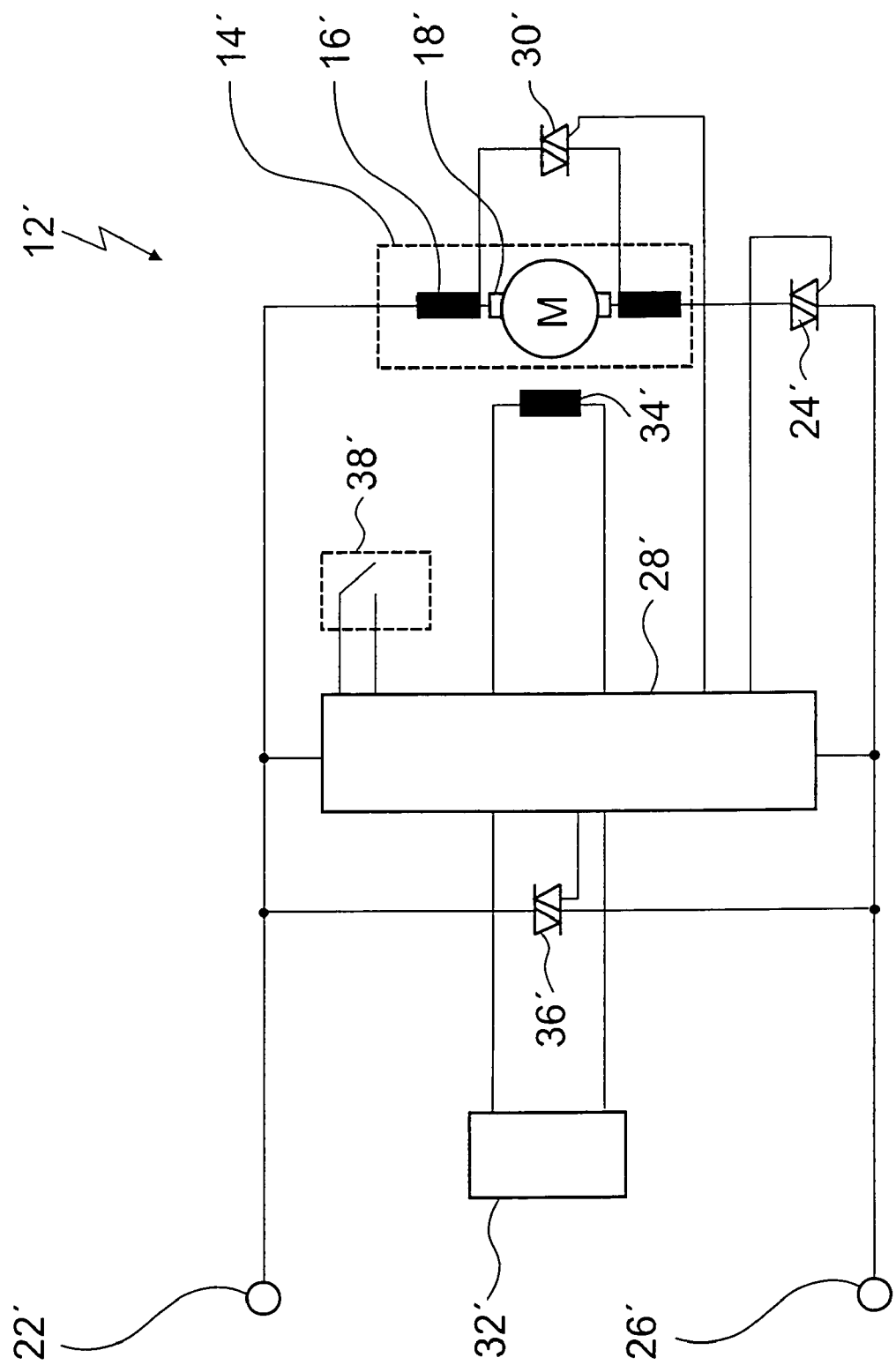
FIG. 3 is a switching diagram on an alternative embodiment of an inventive braking device.

An alternative embodiment of an inventive braking device 12' is shown in FIG. 3. It substantially corresponds to the braking device 12 of the embodiment shown in FIG. 2 so that in order to avoid repetition, a corresponding description of FIG. 2 is not repeated and corresponding components are identified with the same reference numerals provided with primes.

A peculiar feature of the braking device 12' is that the turning off of the direct current series motor 14' is performed not by the delay switch 20 shown in FIG. 2, but instead by a corresponding control of the triac 24'.

In addition, the braking device 12' has a further triac 36 which makes possible an input-side short circuiting between the connecting contacts 22' and 26', while the triacs 36' is controlled by the control unit 28'. The triac 26' makes possible an emergency turning off, by conductively controlling the triac 36' with the control unit 28'. This leads to a short circuiting between the connecting contacts 22' and 26', whereby the associated electrical safety device is released.

For initiating a turning off process, a switching element 38' is provided and connected with the control unit 28'. The control unit 28' controls the triac 24' in correspondence with the switching condition of the switching element 38'.

In this embodiment it is preferable to provide the feature that the switching element 38' can be formed as a simple signal switch which must not control any power. The switching element 38' can be formed as a microswitch or as a pressure-sensitive sensor.

Moreover, in the braking device 12 the time delay function can be provided by a software in the control unit 28. Therefore the delay switch 20 can be dispensed with.

It will be understood that each of the elements described above, or two or more together, may also find a useful application in other types of constructions differing from the types described above.

While the invention has been illustrated and described as embodied in braking device for an electric motor, electrical apparatus provided with the braking device, and a method of braking, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A braking device for an electric motor of a power tool, comprising a short circuit switch for short circuiting an armature winding of the electric motor during a braking process, said short circuit switch having a control input for controlling a switching condition of said short circuit switch; a control unit connected with said control input of said short circuit switch for performing a phase control of said short circuit switch during the braking process in order to avoid brush fire, and further comprising means for supplying current to a field winding of said electric motor during braking of the electric motor at least over a certain time while the armature winding is short circuited.

2. A braking device as defined in claim 1; and further comprising a delay switch for separation of a current supply, said delay switch being operatable by a user and wherein said delay switch switches off with a time delay after a switch handling of the user.

3. A braking device as defined in claim 2, wherein said delay switch is formed so as to provide a predetermined time delay between the switch handling of the user and the separation of the current supply, wherein the time delay is at least as long as the braking process.

4. A braking device as defined in claim 2, wherein said delay switch is connected with said control unit for informing said control unit about a switch handling of the user.

5. A braking device as defined in claim 1; and further comprising a handling sensor for recognizing a handling of the power tool, said handling sensor being connected with said control unit.

6. A braking device as defined in claim 1; and further comprising a rotary speed sensor for detecting a rotary speed of the electric motor, said rotary speed sensor being connected with said control unit for influencing the braking process depending on a rotary speed of the electric motor.

7. A braking device as defined in claim 1; and further comprising a safety switch for short circuiting a current supply in the event of a disturbance, said safety switch having a control input connected to said control unit.

* * * * *